United States Patent [19]
Lecznar et al.

[11] Patent Number: 5,917,163
[45] Date of Patent: *Jun. 29, 1999

[54] MODULAR STEERING WHEEL ASSEMBLY WITH INTEGRATED SWITCH HOUSING

[75] Inventors: Mark T. Lecznar, Grosse Point Woods; Jeffrey A. Branch, Beverly Hills; La Verne R. Newman, Southfield, all of Mich.; Michael J. Tscherne, Toledo, Ohio; Gary J. Kopacz, Dearborn Heights, Mich.

[73] Assignee: UT Automotive Dearborn, Inc., Dearborn, Mich.

[ * ] Notice: This patent is subject to a terminal disclaimer.

[21] Appl. No.: 08/980,093

[22] Filed: Nov. 26, 1997

Related U.S. Application Data

[63] Continuation of application No. 08/545,985, Oct. 20, 1995, Pat. No. 5,714,727.

[51] Int. Cl.⁶ .................................................. H01F 35/04
[52] U.S. Cl. ............................................ 200/61.54; 439/15
[58] Field of Search .......................... 74/484 R, 492, 74/498, 552; 116/31, 284, 294; 200/61.54–61.57; 280/750, 771; 403/326, 359, 364; 439/15, 24, 164

[56] References Cited

U.S. PATENT DOCUMENTS

| | | | |
|---|---|---|---|
| 4,660,500 | 4/1987 | Zeller et al. | 116/31 |
| 4,840,078 | 6/1989 | Shitanoki | 74/484 R |
| 5,171,157 | 12/1992 | Bolen | 439/164 |
| 5,205,754 | 4/1993 | Kuramoto | 439/164 |
| 5,248,260 | 9/1993 | Ida et al. | 439/15 |
| 5,450,769 | 9/1995 | Hu et al. | 74/492 |
| 5,460,535 | 10/1995 | Bolen | 439/164 |
| 5,470,099 | 11/1995 | Williams | 280/728.2 |
| 5,584,503 | 12/1996 | Lutz | 280/731 |
| 5,714,727 | 2/1998 | Lecznar et al. | 200/61.54 |

FOREIGN PATENT DOCUMENTS 0771693  7/1997  European Pat. Off. ........ B60R 16/02

*Primary Examiner*—Michael A. Friedhofer
*Attorney, Agent, or Firm*—Howard & Howard

[57] ABSTRACT

An improved steering wheel assembly includes an integrated switch housing that includes the stalk switch for the vehicle, and further provides the fixed housing for a clock spring. The integrated switch housing reduces the overall size and length of the switches adjacent the steering wheel. Moreover, the integrated switch housing is preferably used with a modular steering wheel and air bag combination that is attached to the wheel after pre-assembly of the modular units. Locking structure ensures there is no relative rotation between the clock spring rotating plate, the clock spring fixed housing, and the modular steering wheel combination until the entire assembly is mounted to the steering column. The combined integrated modular assembly allows testing of all electrical connections prior to mounting the combined assembly to the vehicle.

19 Claims, 3 Drawing Sheets

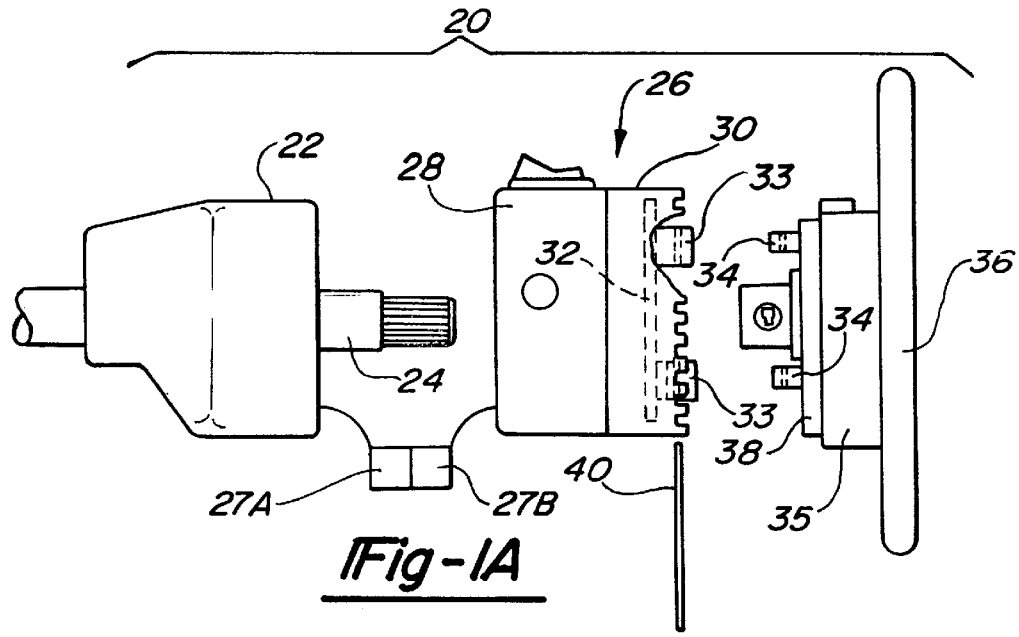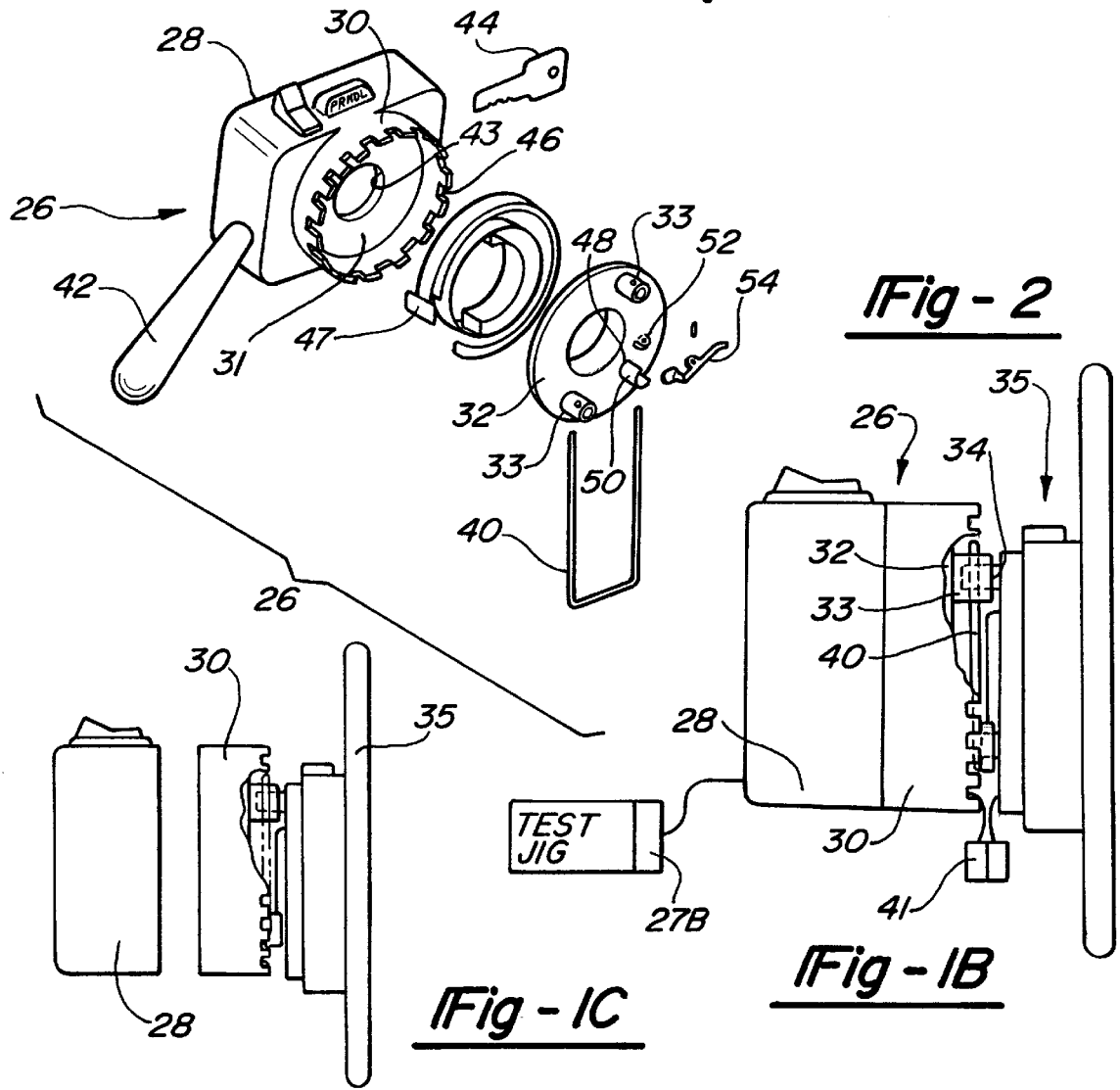

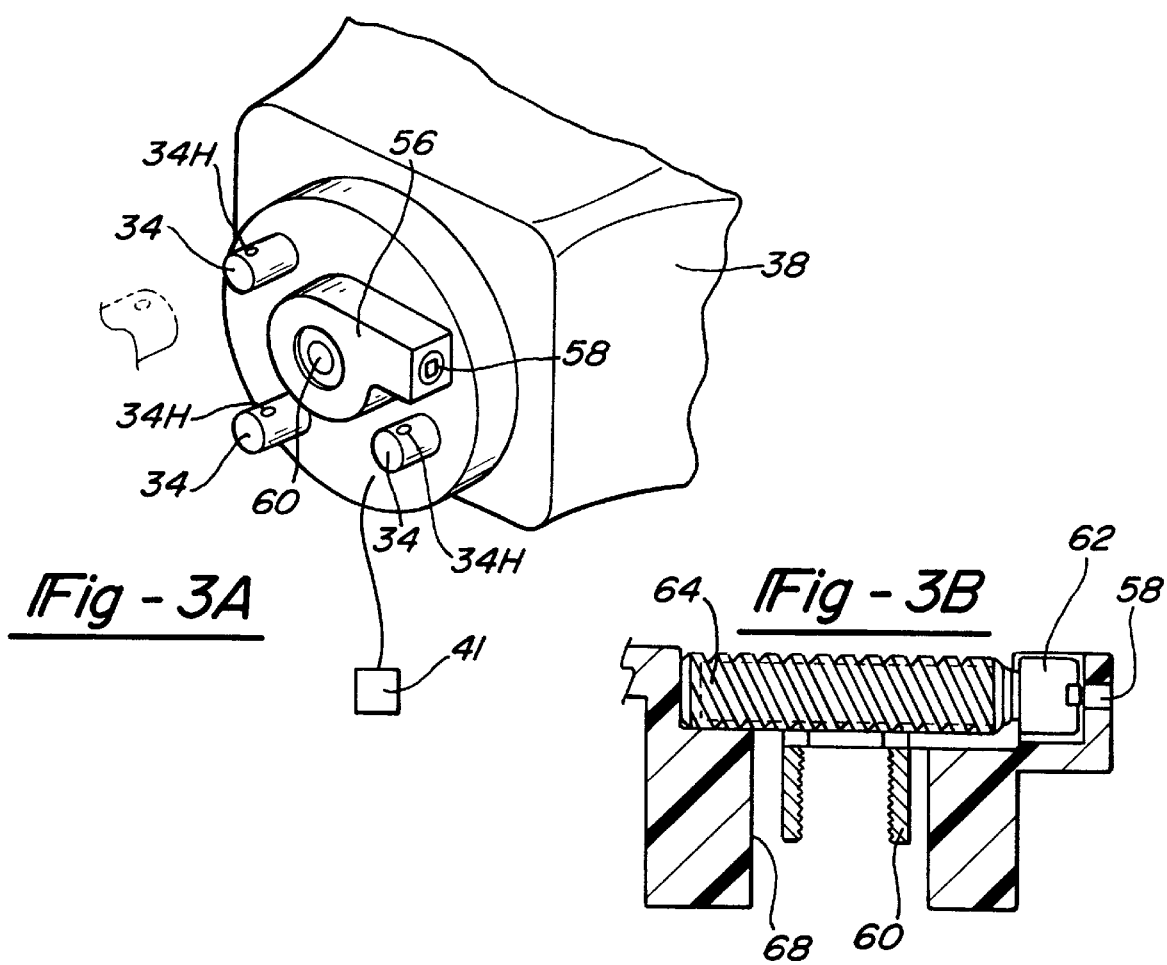
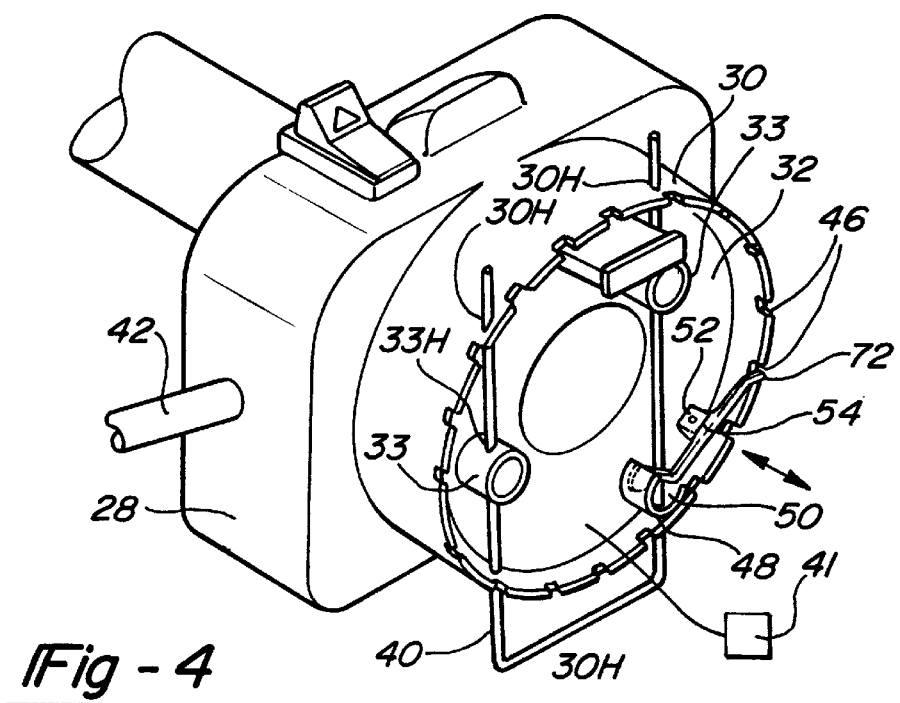

MODULAR STEERING WHEEL ASSEMBLY WITH INTEGRATED SWITCH HOUSING

This is a continuation of U.S. Pat. application Ser. No. 08/545,985 filed Oct. 20, 1995, now U.S. Pat. No. 5,714,727.

BACKGROUND OF THE INVENTION

This invention relates to an assembly which attaches a steering wheel, and electrical switches and connections on and adjacent the steering wheel, to the steering column as a modular unit.

In the prior art, the assembly of the steering wheel is typically a multi-step process. Initially, the electrical connections between the steering column and a clock spring are made. A clock spring is a known electrical connector which allows relative rotation between electrical components on the steering wheel (such as the air bag, horn, cruise control, etc.) and the electric connections leading to systems or controls on the vehicle. A clock spring typically allows several rotations of the steering wheel in either direction while maintaining electrical communications between the steering wheel mounted elements and the fixed steering column.

In the prior art, the clock spring is typically attached to structure on the steering wheel to complete the electrical connections. Moreover, switches mounted on the steering column, such as stalk switches, must also be attached prior to attachment of the steering wheel. Typically, the switches are mounted in a separate housing that must be mounted on the steering column. Once the housings are mounted, the steering wheel is attached to the wheel column. The air bag is then attached to the steering wheel. A cover for the air bag is then placed over the air bag. Typically, an ignition switch is cast into the steering column. The first time an operator may fully test all electrical connections and switches associated with the steering wheel is only after the components have been assembled onto the vehicle. If a problem is discovered, the assembler must then remove the assembly from the vehicle for repair.

The above-described assembly is relatively time-consuming, and labor intensive. Moreover, it requires the final vehicle assembly location to perform a high number of assembly steps. Further, it limits the order in which assembly steps can be performed, and requires the automobile assembly location to maintain an inventory of several different parts. In addition, all of the separate parts and housings increase the overall size of the assembly.

It is a goal of the automotive industry to reduce the number of parts that must be assembled as separate pieces, the required size for the components, and the labor required for assembly. Moreover, it is a goal of any assembly application to reduce restrictions on the order of assembly steps. Finally, it is a goal of the automotive industry to remove as much assembly function from the final vehicle assembly line as possible.

SUMMARY OF THE INVENTION

In the disclosed embodiment of this invention, an integrated housing mounts a stalk switch adjacent to the steering wheel, and further mounts a clock spring for communicating electrical signals to and from the steering wheel within a single housing. The integrated housing is preferably mounted on a modular steering wheel and air bag combination. The combined housing and modular unit will be referred to as an integrated modular steering wheel assembly for purposes of this application. The entire integrated modular steering wheel assembly may be mounted to the fixed steering column as a one-piece unit. Thus, there is not a high degree of labor required at the final vehicle assembly line.

In further features of this invention, the integrated housing may also mount an ignition key lock. The key is preferably of the sort having an anti-drive feature until a magnetic member "recognizes" the key. By integrating all of the switches into a single housing, the invention reduces the required size of the assembly.

The integrated modular steering wheel assembly, with all associated switches and connections may be preassembled, and tested before being mounted on the vehicle. As an example, the integrated modular steering wheel assembly may be preassembled by a component manufacturer, who may then fully test all switches and electrical connections to and from the steering wheel on a test jig. In the past, such complete testing could not occur until the wheel and its associated components were attached to the steering column. In the prior art, repairing an electrical problem required the wheel assembly to be disassembled. This feature may also be utilized with a modular switch housing assembly including separate stalk switch and clock spring housings that are assembled together.

In a separate feature of this invention, a structure is provided for attaching the integrated housing to a hub associated with the modular steering wheel and air bag combination. The modular steering wheel and air bag combination is provided with a driving structure that allows the modular combination to be attached to the vehicle steering column after having been preassembled as a modular unit. The present invention allows the attachment of the integrated housing to the modular combination, and still allows the assembly of the combined integrated modular steering wheel assembly to the steering column. In one embodiment, a worm gear is accessible from outside of the modular unit, and is driven to drive a gear formed with a nut onto the steering column.

The steering wheel hub is preferably formed with bosses or studs extending from a rear face towards the integrated housing. The studs are aligned in mating structure on the rotating clock spring plate. The rotating plate thus rotates with the hub. A fixed clock spring housing which surrounds the rotating plate includes a plurality of openings. The mating structure on the hub and the rotating plate includes complementary apertures aligned with the openings in the fixed housing. A pin is inserted through the fixed housing openings, and extends through the complementary apertures in the mating structure in the rotating plate and hub. In this way, the fixed housing and the rotating plate are prevented from rotating relative to each other during shipment of the clock spring, the integrated housing, or of the combined modular unit. In a preferred embodiment of the invention, the integrated housing provides the fixed housing for the clock spring.

Once the integrated modular steering wheel assembly is placed on the steering column, the pin may be removed. The rotating plate still rotates with the hub due to the mating structure. At the same time, the rotating plate and hub are now free to rotate relative to the integrated housing or fixed clock spring housing.

In yet another feature of this invention, the rotating plate carries a pivoting latch. One end of the latch extends into the mating structure on the rotating plate. The other end of the pivoting latch extends into a notch in the fixed housing. When the pivoting lever is received in the notch, it prevents relative rotation of the rotating plate and the integrated housing. This prevents rotation of the two members prior to the attachment of the integrated housing to the hub. It is preferable that the rotating plate remain at a predetermined rotational position relative to the fixed housing prior to being attached to the hub. If the rotating plate is at a overly rotated position relative to the fixed housing when attached, there may be insufficient turning capability in one direction. That is, a clock spring essentially allows a set number of rotations of the steering wheel relative to the steering column in both directions. It allows such rotation by rotating the plate relative to the fixed housing, and compensating for relative movement by a ribbon coil. If the rotating plate is overly rotated relative to the fixed housing when attached to the hub, then there may be insufficient rotation available in one direction. The latch portion of this invention addresses this possibility.

When the hub is mounted to the rotating plate, the mating structure on the hub force one end of the latch in a sleeve on the rotating plate. This pivots the opposed end of the latch out of the notch, and allows the plate to rotate relative to the fixed housing.

These and other features of the present invention can be understood from the following specification and drawings, of which the following is a brief description.

BRIEF DESCRIPTION OF THE DRAWINGS

FIG. 1A is an exploded view of the three main components of an inventive steering wheel.

FIG. 1B shows two of the components preassembled as an integrated modular unit.

FIG. 1C shows an alternative embodiment.

FIG. 2 is an exploded view of the one of the components shown in FIG. 1A.

FIG. 3A shows an end view of another of the components.

FIG. 3B is a cross-section of a portion of the FIG. 3A component.

FIG. 4 is a view of an intermediate assembly according to the present invention.

DETAILED DESCRIPTION OF A PREFERRED EMBODIMENT

Figure 6:
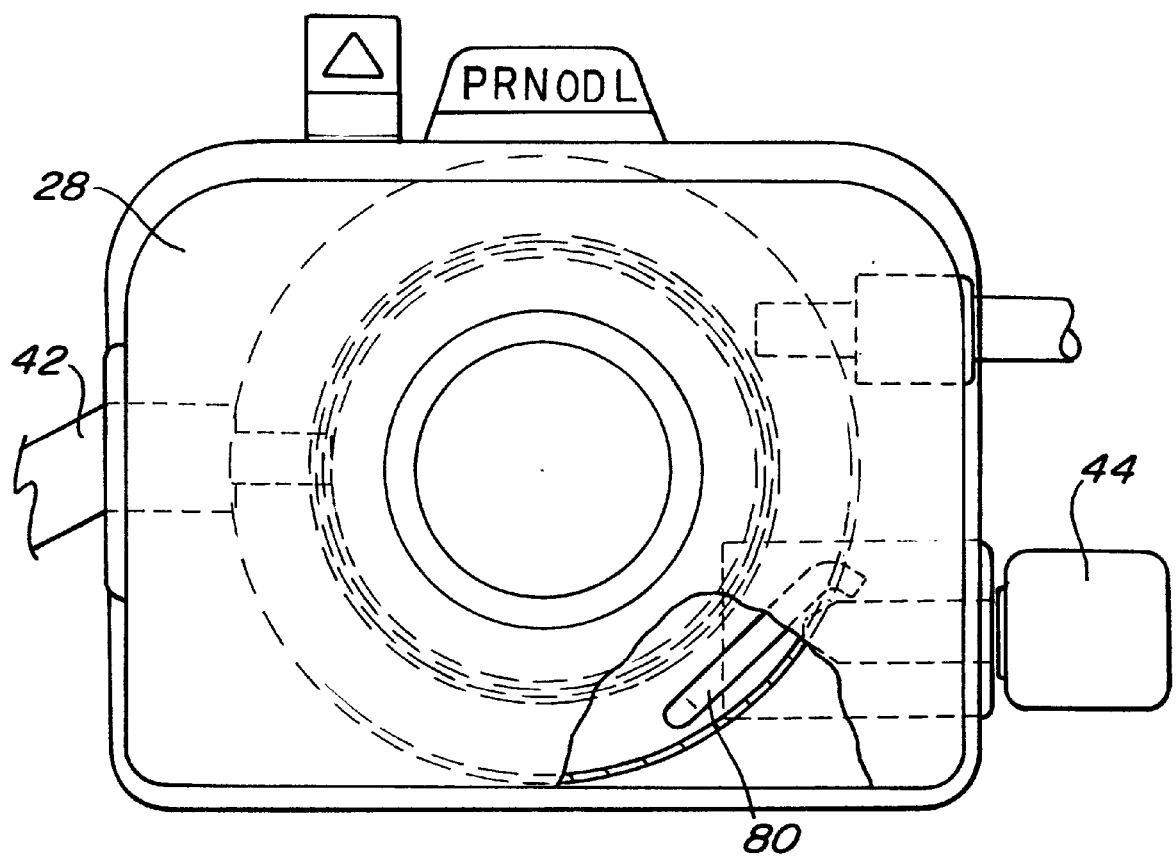
FIG. 6 is an end view of one portion of the present invention.

FIG. 1A shows an assembly 20 incorporating an outer cover 22 surrounding a steering column 24. An integrated housing 26 includes a switch housing 28, and a fixed clock spring housing 30 formed integrally with the housing 28. An electrical connection between the integrated housing 26 and the steering column is shown schematically at 27. In practice, the connections may be more complicated then the simple plugs 27A and 27B. Plug 27B is shown as a schematic representation of all electrical connections from housing 26, including those from unit 35 as described below.

A rotating clock spring plate 32 is received within fixed housing 30. Plate 32 is formed with a plurality of sleeves 33 that extend towards a modular steering wheel and air bag combination 35. A plurality of studs 34 extend from a rear face of the modular combination 35, to mate with sleeves 33. The modular combination 35 includes steering rim portion 36 and a rear hub portion 38. The details of this structure are disclosed in a co-pending U.S. patent application Ser. No. 08/903,206, entitled "Modular Steering Wheel and Air Bag Combination" which also claims the benefit of provisional application Ser. No. 60/03,934, filed Sept. 15, 1995.

Pin 40 extends through holes in the housing 30, the sleeves 33 and the studs 34 to hold the plate 32, the housing 30, and the modular combination 35 at a desired rotational position. One main feature of this invention is the ability to assemble the switches, the steering wheel, and the air bag as a single integrated modular assembly and attach the entire assembly to the steering column as a one-piece unit. This greatly reduces the number of separate parts, the labor requirements at the assembly line, and frees up many assembly options.

As shown in FIG. 1B, the integrated housing 26 and the modular combination 35 have been preassembled into an integrated modular assembly. Pin 40 extends through housing 30, sleeves 34 and studs 34. The pin holds all three of the members together without allowing relative rotation. It is important to prevent relative rotation of the plate 32 relative to the housing 30 until the entire assembly is attached to the vehicle. An electrical connection 41 is shown schematically, and connects the clock spring to components in the modular combination 35.

One other important aspect of this invention is that once the integrated housing 26 and the modular unit 35 are assembled as a unit as shown in FIG. 1B, all of the switches and electrical connections on the preassembled unit may be tested on a test jig prior to being mounted to the vehicle. The test jig is shown schematically in FIG. 1B connected to the connection 27B. The structure of the test jig would vary with the particular electrical connections and switches on the combined housings 26 and 35. It is an important aspect of this invention, however, that the integrated housing 26 and the modular combination 35 may be preassembled and fully tested prior to mounting on a vehicle.

FIG. 1C shows a switch assembly including a separate stalk switch housing 28, and clock spring housing 30. The separate housings can be assembled together to achieve the combined assembly of FIG. 1B for testing and assembly as a single combined assembly. Known connection structure may be used. In fact, in achieving the pretest features of this invention many possible combinations and types of switch housing are possible.

As shown in FIG. 2, the integrated housing 26 includes a stalk switch 42 included into the integrated housing 26 at switch portion 28. Further, the key lock for key 44 may also be incorporated into the integrated housing 26. Thus, when the modular unit as shown in FIG. 1B is tested, the stalk switch functions (which typically include windshield wipers, lights, etc.), as well as the ignition function may all be pretested prior to being mounted on the vehicle.

As further shown in FIG. 2, notches 46 are formed in fixed housing 30. The clock spring ribbon 47 is shown schematically, and forms no portion of this invention. A rotating plate 32 includes a plurality of sleeves 33. One sleeve 48 has notch 50. A pivot point 52 is formed on plate 30. A pivot latch 54 is mounted at point 52, as will be described below.

As shown in FIG. 3A, the hub 38 of the modular combination 35 includes studs 34 each having holes 34H for receiving the pin 40. Further, a drive housing 56 includes an access opening 58. A nut 60 is shown extending outwardly of the drive housing 56.

As disclosed in more detail in the above-referenced application, one drive assembly for attaching the modular unit 35 to the steering column 24 includes a worm and worm gear combination. The same drive may attach the integrated housing 26 as part of this invention.

FIG. 3B shows details of the drive assembly. The worm 62 is driven by a tool through the access opening 58. Worm 62 rotates worm gear 64, to in turn drive nut 66 onto threads on the steering column 24. A wedge connection is also made between hub collar 68 and the steering column at that time. Thus, the invention may be preassembled as shown in FIG. 1B, and as long as access is still allowed to the opening 58, the entire integrated modular assembly may be assembled to a steering column as a single step. This greatly reduces the required labor.

As shown in FIG. 4, the integrated housing 26 may also be preassembled as a modular unit prior to being attached to the modular combination 35. Sleeves 33 all include holes 33H. The fixed housing 30 includes housing holes 30H. Pin 40 extends through housing holes 30H, and through the sleeve holes 33H. When in the position shown in FIG. 1B, the pin 40 also extends through the stud holes 34H.

As shown in FIG. 4, latch 54 has inner end 71 received in the opening 50, and an outer end 72 received in notch 46. Thus, latch 54 prevents relative rotation of plate 32 and housing 30, even without pin 40. Pin 40 also prevents relative rotation of the two until the entire assembly is mounted on the steering column.

Figure 5:
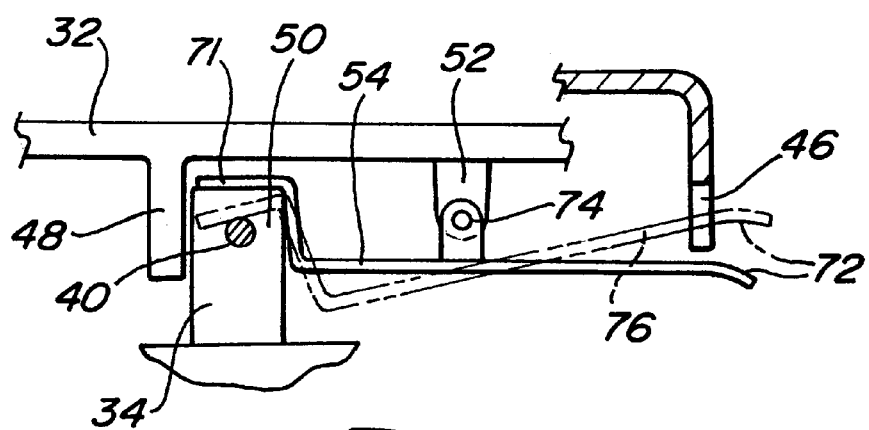
FIG. 5 is a view through a portion of the structure shown in FIG. 4.

As shown in FIG. 5, once the modular combination 35 is attached to the integrated housing 26, latch 54 no longer performs an anti-rotation function. Instead, stud 34 hits inner end 71 of latch 54 and pivots outer end 72 outwardly of the notch 46. Latch 54 pivots about a pivot point 74 on mount 52. Preferably, a spring is disposed at the pivot point 74 to bias latch 54 to the position shown in phantom at 76 in FIG. 5. In that position, outer end 72 is received in notch 46. The latch thus prevents relative rotation of plate 32 relative to housing 30 until the hub plate is attached to the integrated housing 26.

As shown in FIG. 6, integrated housing 26 may also incorporate the ignition switch 44. In this embodiment, an anti-drive control 80 initially identifies the key before allowing ignition. This ignition may be performed electronically, once the control 80 recognizes the key 44. The technology for identifying the key 44 by the control 80 is known, and forms no portion of this invention. It is the incorporation of the ignition key function into the integrated housing 26 which is the inventive aspect of this invention.

In completing the assembly of the integrated modular steering wheel assembly to a vehicle steering column, the modular steering wheel and airbag combination is assembled, and the integrated housing is initially assembled. The integrated housing sub-assembly includes the steps of mounting a stalk switch in the integrated housing, and further mounting a clock spring in the integrated housing. The pin 40 may secure the rotating plate relative to the fixed housing after this sub-assembly. Alternatively, the latch 54 prevents relative rotation of the rotating plate and fixed housing. The integrated housing 26 may also mount the ignition key, and if so, this is also mounted into the integrated housing at this point. The integrated housing is then mounted to the modular combination of the steering wheel and air bag. If the separate housings of FIG. 1C are used they are both attached at this point. At this point, the connections 41 between the integrated housing and the modular combination are made. The integrated modular assembly may then be tested. At that time, the stalk switch, the ignition key, the clock spring, and all electrical connections in the switch housing or modular combination may be tested, prior to any of the components being mounted to the vehicle. If a problem or fault is found in any of the electrical components, repair or replacement of that component is much simpler than if the assembly had already been mounted to a vehicle.

Once the integrated modular assembly has been tested, the entire assembly may be mounted to a vehicle as a single assembly. Structure on the integrated housing preferably snaps onto steering column 24, or is otherwise connected. The pin 40 is then removed. The worm gear is then driven to drive the nut onto the threads on the steering column 24. As the worm drives the nut 60 onto the steering column, the modular combination 35 and plate 32 moves downwardly relative to housing 26, and onto the column locking the entire assembly to the vehicle steering column. This is a simple assembly that greatly reduces the labor requirements of prior art assemblies. An outer cover may also be incorporated into the assembly to cover the components. Preferably, the outer cover will still allow access to the hole 58 for driving the worm.

A preferred embodiment of this invention has been disclosed, however, a worker of ordinary skill in the art would recognize that certain modifications would come within the scope of this invention. For that reason the following claims should be studied to determine the true scope and content of this invention.

We claim:

1. A modular steering wheel assembly comprising:
   a steering wheel rim attached to a hub, and an air bag attached to said hub to form a subassembly;
   a clock spring including a fixed housing and a rotating plate attached to said hub for communicating electrical signals to and from said subassembly, said clock spring and said subassembly forming an assembly;
   structure for preventing relative rotation between said fixed housing and said rotating plate, and
   a drive to attach said assembly to a steering column as a unit, and said structure allowing relative rotation of said fixed housing and said rotating plate after said assembly is attached to a steering column.

2. An integrated switch housing assembly comprising:
   a housing mounting a switch stalk for providing an operator with several control options;
   a clock spring including a rotating plate received within said housing, said housing providing the fixed housing for said clock spring.

3. A switch housing as recited in claim 2, including structure to prevent relative rotation of said plate and said fixed housing during transport or assembly of said switch housing.

4. A switch housing as recited in claim 3, wherein said structure includes a latch biased to a locking position in a notch in said fixed housing, said latch fixed to said rotating plate, said latch being moved out of said notch to a non-locking position when said housing is mounted onto a steering wheel assembly.

5. A switch housing as recited in claim 4, wherein said latch pivots on said rotating plate between said locking and non-locking positions.

6. A switch housing as recited in claim 5, wherein said latch extends between two ends, and is pivotally attached to said rotating plate at a central location between said two ends, one of said ends extending into a sleeve on said rotating plate, the other of said ends extending into said notch.

7. A switch housing as recited in claim 6, wherein said housing includes at least one hole, and a corresponding hole in said sleeve, and a pin extending through said holes to hold said rotating plate against rotation relative to said housing during transport of said switch housing.

8. A switch housing as recited in claim 2, wherein said housing further includes an ignition switch.

9. A switch housing as recited in claim 8, wherein said ignition switch includes an anti-drive means to recognize a key.

10. A method of assembling a steering wheel onto a vehicle comprising the steps of:
   1) providing a steering wheel, a hub for mounting said steering wheel to a steering column, an air bag, and a switch housing assembly including at least one switch and electrical connections to communicate electrical signals to and from said steering wheel and said air bag;
   2) attaching said air bag, said steering wheel and said hub as a first modular unit;
   3) mounting said switch housing assembly to said first modular unit, and completing electrical connections between said switch housing and said first modular unit;
   4) testing said switch and said electrical connections on said first modular unit and said switch housing; and
   5) mounting said first modular unit and said switch housing as a single assembly to a steering column of a vehicle.

11. A method as recited in claim 10, wherein said switch housing electrical connections are provided by a clock spring.

12. A method as recited in claim 11, wherein antirotation members prevent rotation of said clock spring and said hub until after step 5).

13. A method as recited in claim 11, wherein said switch includes a stalk switch.

14. A method as recited in claim 13 wherein said switch housing for said switch and said clock spring is a single integral housing.

15. A method as recited in claims 10, wherein said switch includes the ignition switch for the vehicle.

16. A combination switch apparatus comprising:

a combination switch fitted to a steering column of a vehicle and provided with at least one switch for operating a load in the vehicle; and a rotary connector having terminals for electrically connecting circuits on a chassis of the vehicle with circuits on a steering wheel of the vehicle;

wherein said combination switch includes a main body to which a rotor housing provided on the steering wheel is rotatably connected, and a connection member is placed in a space defined by the main body and the rotor housing.

17. A combination switch apparatus as recited in claim 16, wherein said connection member comprises a flat cable whose ends are connected to said terminals, respectively.

18. An integral combination switch apparatus and rotary connector for a vehicle comprising:

a main body having a central opening for fitting over a steering column of a vehicle, said main body having an accommodation space disposed generally coaxially about said central opening, said main body housing a stalk switch assembly for operating wipers and lights of a vehicle, respectively; and a rotary connector mounted to said main body and covering said accommodation space, said rotary connector having first and second terminals for electrically connecting the rotary connector to circuits on a chassis and circuits on a steering wheel of a vehicle, respectively, and a connection member placed in said accommodation space and having first and second ends connected to said first and second terminals, respectively.

19. An integral combination switch apparatus and rotary connector recited in claim 17, wherein said connection member comprises a flat cable whose ends are connected to said first and second terminals, respectively.

* * * * *